United States Patent
Farnsworth et al.

(10) Patent No.: US 6,814,539 B2
(45) Date of Patent: Nov. 9, 2004

(54) HIGH ENERGY PARTICLE ARRESTOR FOR AIR TURBINE STARTERS

(75) Inventors: Gary A. Farnsworth, Mesa, AZ (US); Glenn H. Lane, Chandler, AZ (US); Douglas C. Smith, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/315,405

(22) Filed: Dec. 10, 2002

(65) Prior Publication Data

US 2003/0161721 A1 Aug. 28, 2003

Related U.S. Application Data

(63) Continuation of application No. 10/004,906, filed on Dec. 4, 2001.

(51) Int. Cl.[7] ............................................. F01D 21/00
(52) U.S. Cl. ................................. 415/121.1; 415/121.2
(58) Field of Search ........................... 415/121.1, 121.2; 60/786, 787, 788

(56) References Cited

U.S. PATENT DOCUMENTS

| | | |
|---|---|---|
| 3,241,813 A | 3/1966 | Von Flue et al. |
| 3,261,228 A | 7/1966 | Rothman |
| 3,338,049 A * | 8/1967 | Fernberger ............... 60/39.092 |
| 3,465,950 A * | 9/1969 | Fried et al. .................... 55/306 |
| 3,557,537 A | 1/1971 | Roberts |
| 3,616,616 A | 11/1971 | Flatt |
| 3,652,176 A | 3/1972 | Walsh |
| 3,989,407 A | 11/1976 | Cunningham |
| 4,044,550 A | 8/1977 | Vermilye |
| 4,076,508 A | 2/1978 | Christensen |
| 4,157,013 A | 6/1979 | Bell |
| 4,197,052 A | 4/1980 | Lardellier |
| 4,445,532 A | 5/1984 | Mitchell |
| 4,459,121 A | 7/1984 | Gazzera et al. |
| 4,509,962 A | 4/1985 | Breitman et al. |
| 4,779,413 A | 10/1988 | Mouton |
| 4,867,634 A | 9/1989 | Baker et al. |
| 4,871,296 A | 10/1989 | Laessle et al. |
| 4,914,906 A | 4/1990 | Burch |
| 4,955,192 A | 9/1990 | Shekleton |
| 5,152,134 A | 10/1992 | Boyd et al. |
| 5,188,510 A | 2/1993 | Norris et al. |
| 5,203,674 A | 4/1993 | Vinciguerra |
| 5,245,820 A | 9/1993 | Zalewski et al. |
| 5,267,433 A | 12/1993 | Burch |
| 5,340,276 A | 8/1994 | Norris et al. |
| 5,419,420 A | 5/1995 | Quenneville |
| 5,538,258 A | 7/1996 | Hager et al. |
| 5,603,604 A | 2/1997 | Norris et al. |
| 5,613,830 A | 3/1997 | Chan et al. |
| 5,752,383 A | 5/1998 | Rominek |
| 5,934,868 A | 8/1999 | Battig et al. |
| 6,059,085 A | 5/2000 | Farnsworth |
| 6,131,797 A | 10/2000 | Gasdaska et al. |
| 6,533,541 B1 * | 3/2003 | Farnsworth et al. ..... 415/121.1 |

FOREIGN PATENT DOCUMENTS

| | | |
|---|---|---|
| GB | 638094 | 5/1950 |
| WO | WO 92/07180 | 4/1992 |

* cited by examiner

Primary Examiner—Ninh H. Nguyen
(74) Attorney, Agent, or Firm—Douglas A. Mullen, Esq.

(57) ABSTRACT

One or more particle arrestors are mounted in a curved radial flow portion of a gas turbine starter annular flow passage, between a fluid inlet and a fluid outlet. The one or more arrestor rings block line of sight paths between the turbine wheel and the annular flow passage outlet. Thus, the one or more arrestor rings substantially inhibit relatively high energy particles from exiting the turbine housing, thus substantially inhibiting collateral damage to surrounding equipment and structure.

16 Claims, 5 Drawing Sheets

HIGH ENERGY PARTICLE ARRESTOR FOR AIR TURBINE STARTERS

RELATED APPLICATIONS

This is a continuation of, and claims priority from, U.S. patent application Ser. No. 10/004,906, filed Dec. 4, 2001, entitled High Energy Particle Arrestor For Air Turbine Starters.

BACKGROUND OF THE INVENTION

The present invention relates to gas turbine engines and, more particularly, to high energy particle arrestors that are placed in starter turbines to inhibit damage to surrounding equipment in the event of an internal mechanical failure within the turbine housing.

Many relatively large turbine engines, including turbofan jet engines, may use an air turbine starter (ATS) to initiate their rotation. The ATS is mounted by the jet engine, much as a starter for an automobile is located by the automobile's engine. The ATS may be coupled to a high pressure fluid source, such as compressed air, which impinges upon the turbine wheel in the ATS causing it to rotate at a relatively high rate of speed. The ATS includes an output shaft that is coupled, perhaps via one or more gears, to the jet engine. The output shaft rotation in turn causes the jet engine to begin rotating. The applicant for the present invention, Honeywell International, Inc., has for years successfully designed, developed and manufactured ATSs.

Air turbine starters are robustly manufactured and operationally safe. Nonetheless, for conservatism and/or to meet certain regulatory requirements, ATSs may be analyzed for certain postulated failure modes, that may occur under certain, highly unlikely conditions. For example, one particular type of postulated failure mode that ATSs may be analyzed for is a turbine wheel failure. A turbine wheel failure may be caused by a postulated failure of the turbine wheel itself, including the turbine wheel hub, the turbine wheel blades, or both, or by failure of the thrust bearing assembly that rotationally mounts the turbine wheel. No matter the specific postulated failure mode, if a turbine wheel failure occurs at a relatively high rotational speed (e.g., several thousand r.p.m.), high energy fragments or particles can be expelled from the ATS housing and may cause damage to surrounding components and structure, including the large turbine engine.

To inhibit relatively high energy fragments from penetrating the ATS housing and causing collateral damage, many ATSs include a containment ring. The containment ring may be made of relatively high strength material and is positioned radially outward from the turbine wheel. Some ATSs may also include a cutter ring positioned proximate the turbine wheel hub. The cutter ring is operable to sever the turbine blades if the thrust bearing fails.

Although the above-described containment mechanisms may inhibit a majority of fragments from penetrating the ATS housing, some smaller, relatively high energy particles may still exit the ATS through the ATS's fluid exhaust passage. To inhibit the egress of these particles at high energy, an ATS may include a plurality of flat disks that are mounted to the ATS housing, and positioned over the exhaust outlet port. However, these disks inhibit only a fraction of the particles that may be ejected from the exhaust passage. Thus, collateral damage can still occur. One reason for this is that the disks, due to their structure and location, may not block particles that originate in the line of sight of the exhaust outlet port. Another weakness of these disks is their shape, which makes them conducive to vibration induced fatigue. Moreover, because the disks are mounted to the ATS housing, the size envelope of the ATS increases.

Hence, there is a need for a particle arrestor that substantially inhibits high energy particles from exiting a turbine housing. There is additionally a need for a particle arrestor that is less conducive to vibration induced fatigue failure. There is also a need for a particle arrestor that, when installed, does not increase the turbine's size envelope. The present invention addresses these needs.

SUMMARY OF THE INVENTION

The present invention provides a particle arrestor for a gas turbine that substantially inhibits relatively high energy particles from exiting the gas turbine housing, thus substantially inhibiting collateral damage to surrounding equipment and structure, and/or that is less conducive to vibration induced fatigue failure, and/or does not increase the starter turbine's size envelope.

In one aspect of the present invention, a gas turbine includes a turbine housing, a turbine wheel, and at least one particle arrestor ring. The turbine housing has an annular fluid flow passage extending through it that extends from a fluid inlet port through a substantially axial flow portion and then through a substantially curved radial flow portion to a fluid outlet port. The turbine wheel is rotationally mounted within the turbine housing and has at least two turbine blades extending radially into the axial flow portion. The particle arrestor ring has an inner peripheral portion and an outer peripheral portion, and is mounted within the curved radial flow portion such that the inner peripheral portion is positioned proximate the turbine blades.

In another aspect of the invention, a particle arrestor ring is provided for insertion into a gas turbine engine having an annular fluid flow passage extending from a fluid inlet port through a substantially axial flow portion and then through a substantially curved radial flow portion to a fluid outlet port, and having a turbine wheel rotationally mounted within the turbine housing and having at least two turbine blades extending radially into the axial flow portion. The particle arrestor ring includes a main body portion bounded by an inner peripheral portion and an outer peripheral portion, the main body portion has a generally conical shape, and has a substantially curved cross section extending between the inner peripheral portion and the outer peripheral portion.

In yet another aspect of the present invention, in a gas turbine engine having an annular fluid flow passage extending from a fluid inlet port through a substantially axial flow portion and then through a substantially curved radial flow portion to a fluid outlet port, and having a turbine wheel rotationally mounted within the turbine housing and having at least two turbine blades extending radially into the axial flow portion, a method of modifying the turbine to include at least one particle arrestor ring having a main body portion bounded by an inner peripheral portion and an outer peripheral portion includes the step of disassembling at least a portion of the housing. Then, at least one particle arrestor ring is inserted into the radial flow portion, and mounting each particle arrestor ring in the turbines radial flow portion such that its inner peripheral portion is positioned proximate the turbine blades.

Other independent features and advantages of the invention will become apparent from the following detailed description, taken in conjunction with the accompanying drawings which illustrate, by way of example, the principles of the invention.

DETAILED DESCRIPTION OF PREFERRED EMBODIMENTS

Figure 1:
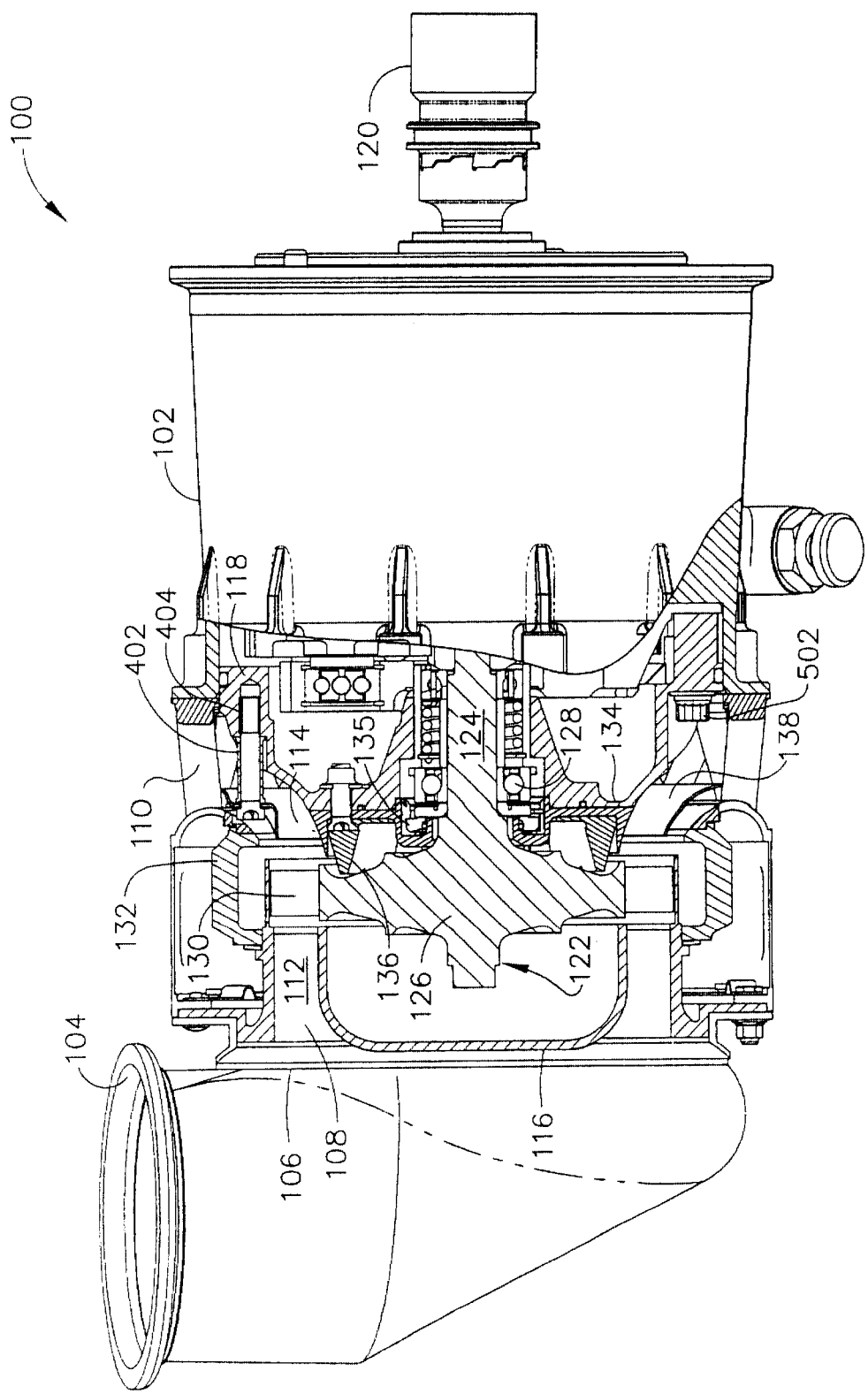
FIG. 1 is a partial cross section of an air turbine starter according to an embodiment of the present invention.

A partial cross section view of an exemplary air turbine starter (ATS) that is used to initiate the rotation of a larger turbine, such as a turbofan jet engine, is depicted in FIG. 1. The ATS 100 is enclosed within a housing assembly 102. One end of the housing assembly 102 is coupled to an inlet plenum 104, which directs compressed air into the housing assembly 102. The housing assembly 102 includes an inlet port 106, which receives the compressed air from the inlet plenum 104. The compressed air received at the inlet port 106 flows through an annular flow passage 108 and exits the housing assembly 102 via a radial outlet port 110. The annular flow passage 108 includes an axial flow portion 112 and a substantially curved radial flow portion 114. The axial flow portion 112 is formed through a stator assembly 116 that is mounted within the housing assembly 102 proximate the fluid inlet port 106. The radial flow portion 114, which flares the annular flow passage 108 radially outwardly, is formed between a portion of the housing assembly 102 and an exhaust housing 118 that is mounted within the housing assembly 102. An output shaft 120 extends from another end of the housing assembly 102, and is used to impart rotational motion to another turbine engine, such as an aircraft jet engine, that may be coupled to the output shaft 120, either directly or by a gear train.

A turbine wheel 122 is rotationally mounted within the housing assembly 102. In particular, the turbine wheel 122 has a shaft 124 that extends from a hub portion 126, through the exhaust housing 118, and that is rotationally mounted using one or more thrust bearing assemblies 128. The turbine shaft 124 is coupled to the output shaft 120, via various conventional hardware devices that, for the sake of brevity, are not further depicted nor described. A plurality of turbine blades 130 extend radially from the hub portion 126 into the annular flow passage 108. More particularly, the turbine blades 130 are positioned within the axial flow portion 112 just upstream of the radial flow portion 114.

Also shown in FIG. 1, are a generally circular containment ring 132, a seal housing 134, and a cutter ring assembly 136, each of which will be briefly discussed, and a particle arrestor ring 138, which will be discussed in detail. The containment ring 132 is mounted within the housing assembly 102 and surrounds the outer peripheral portion of the turbine blades 130. The containment ring 132 is a relatively strong, metallic ring that inhibits turbine fragments that may be created from a turbine wheel failure, and that may be thrown against the containment ring 132, from penetrating the housing assembly 102. The seal housing 134 surrounds a portion of the turbine shaft 124 and houses one or more rotary seals 135. The cutter ring assembly 136 is mounted to the seal housing 134. The cutter ring assembly 136 includes a plurality of pins that extend axially from the ring 136, and are constructed of a hard material, such as, for example tungsten carbide. As was noted above, the pins in the cutter ring assembly 136 sever the turbine blades 130 from the turbine wheel 122 in the event a failure within the ATS 100 causes the turbine wheel 122 to shift to the right, as viewed in FIG. 1.

Figure 2:
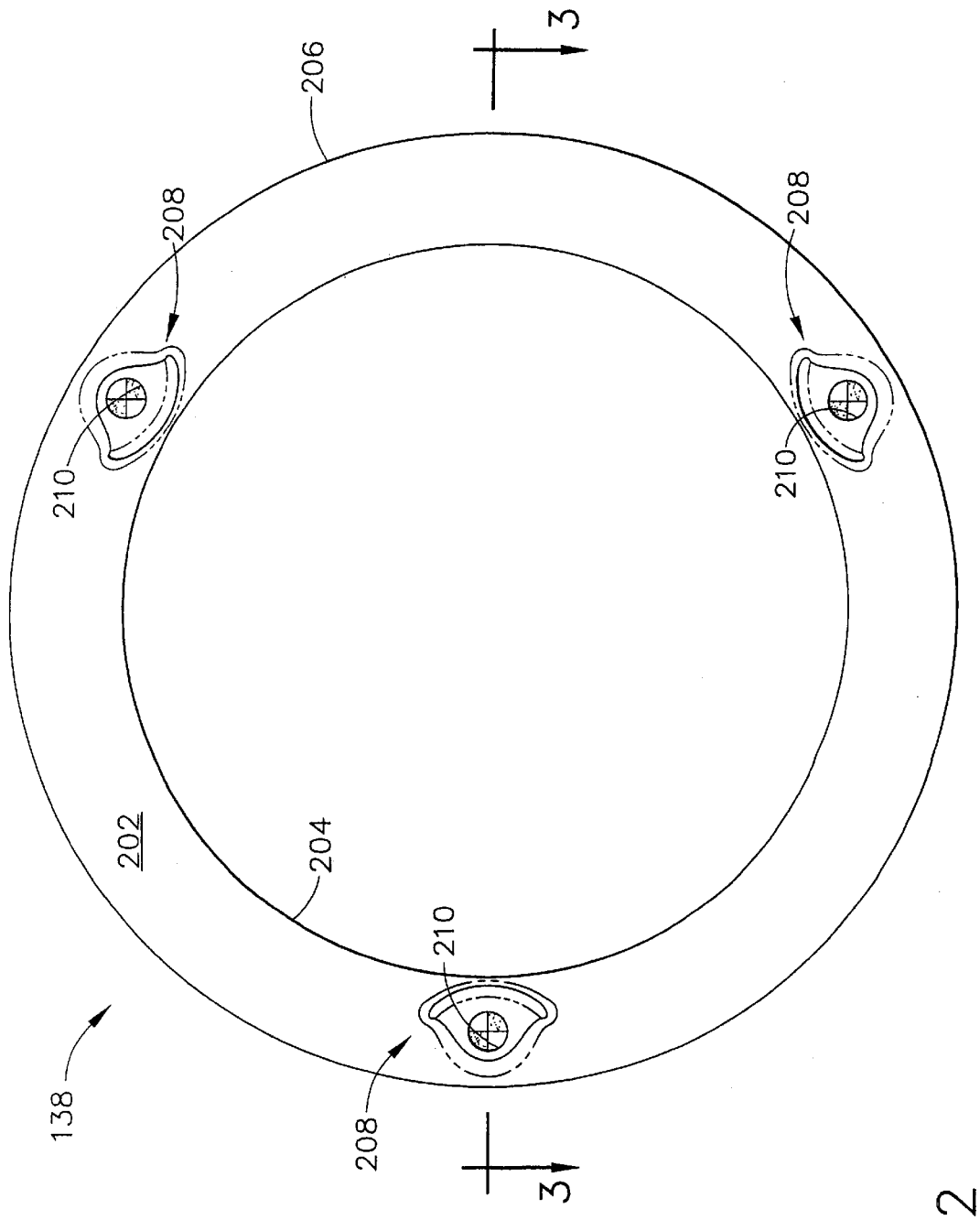
FIG. 2 is an end view of an exemplary particle arrestor ring according to an embodiment of the present invention that is installed in the turbine depicted in FIG. 2.
Figure 3:
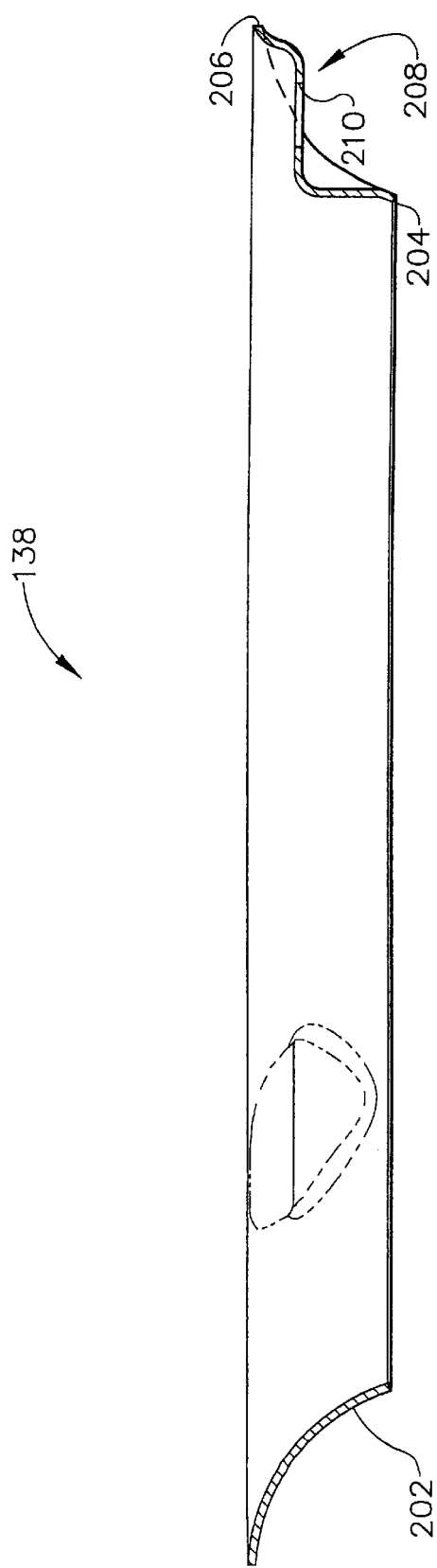
FIG. 3 is a cross section view of the particle arrestor depicted in FIG. 2, taken along the line 3—3 in FIG. 2.

Turning now to the particle arrestor ring 138, which is shown more particularly in FIGS. 2 and 3, it is seen that it has a generally cone-shaped main body portion 202, having an inner periphery 204, an outer periphery 206, and a substantially curved cross section. In particular, the particle arrestor ring 138 is curved in both an axial plane and a radial plane. Thus, the inner periphery 204 is non-coplanar with the outer periphery 206. A plurality of substantially flat flange members 208 are formed into the main body portion 202 of the particle arrestor ring 138 and spaced apart around the particle arrestor ring 138. An opening 210 is formed through each of the flange members 208. It will be appreciated that the spacing of the flange members 208 and openings 210 around the particle arrestor ring 138 may be either even or uneven, depending upon the configuration of the exhaust housing 118. The threaded fasteners 140 that are used to mount the particle arrestor ring 138 to the exhaust housing 118 pass through the openings 210 formed in the flange members 208. In a preferred embodiment, the particle arrestor ring 138 includes three openings 210, though it will be appreciated that other numbers of openings could be used.

The particle arrestor ring 138 is preferably constructed of a high strength metallic material including, but not limited to, steel, aluminum, an Inconel alloy, and a Monel alloy. Preferably, however, it is constructed of an Inconel alloy. Moreover, it is to be appreciated that although only a single particle arrestor ring 138 is depicted and described, two or more deflector rings 138 could also be mounted within the radial flow portion 114. However, a single particle arrestor ring 138 is preferred since using a plurality of particle arrestor rings 138 may adversely affect turbine performance.

Figure 4:
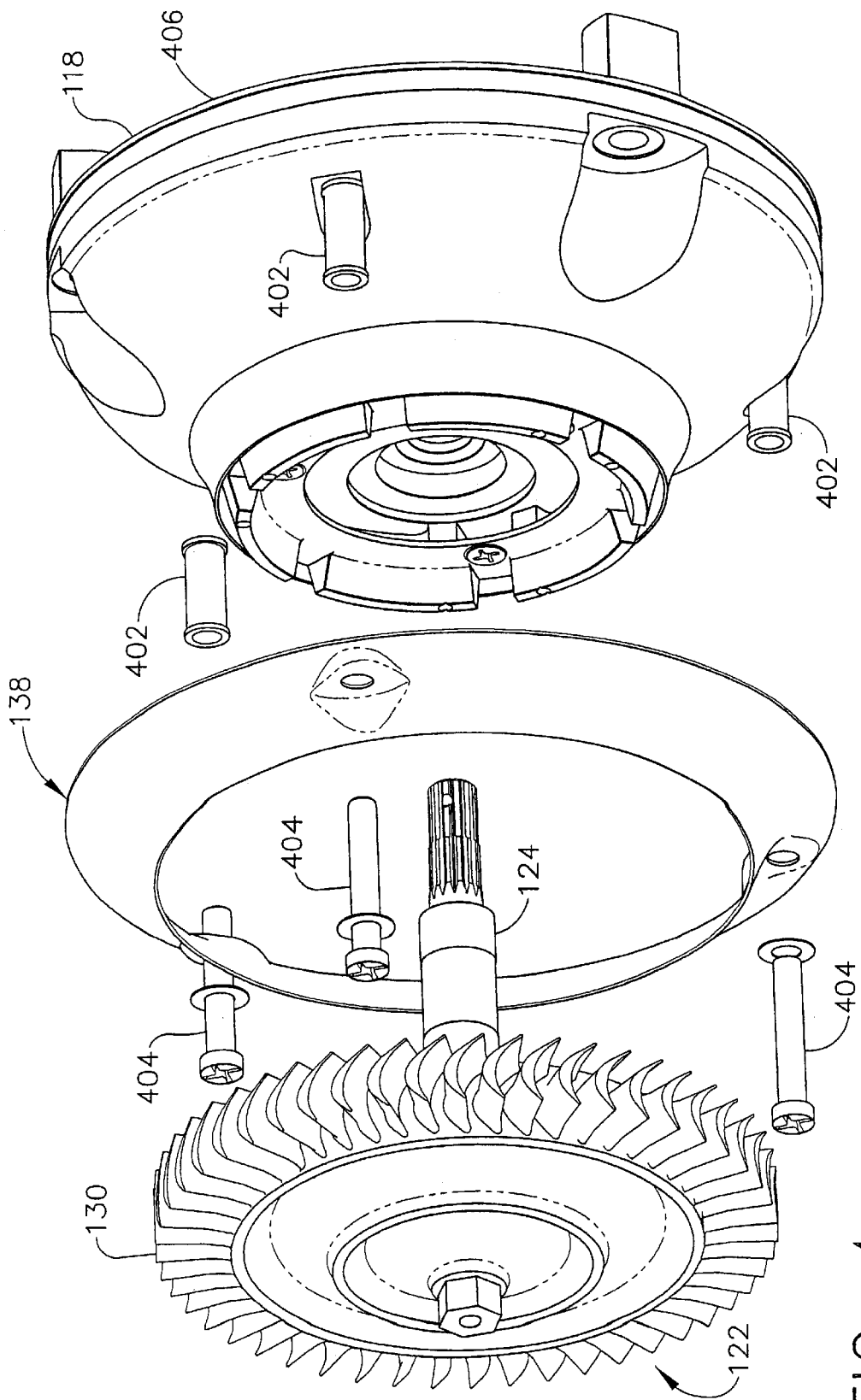
FIG. 4 is a perspective exploded view illustrating how the particle arrestor ring of FIGS. 2 and 3 are mounted within the air turbine starter of FIG. 1.

The particle arrestor ring 138, as depicted in FIGS. 1, is mounted within the radial flow portion 114 of the annular flow passage 108. As more particularly depicted in FIG. 4, the particle arrestor ring 138 may be mounted within the radial flow portion 114 using two or more spacers 402 and two or more threaded fasteners 404 that mate with threaded openings formed in the exhaust housing 118. In the particular embodiment depicted in FIG. 4 and the subsequent figures as well, three spacers 402 and three threaded fasteners 404 mate with three pre-existing threaded maintenance openings 406 formed in the exhaust housing 118. It will be appreciated that the present invention is not limited to the use of three openings, spacers and threaded fasteners, and that other numbers of openings could be formed into both the exhaust housing 118 and particle arrestor ring 138, which would utilize other numbers of spacers 402 and threaded fasteners 404.

As was noted above, the particle arrestor ring 138 has an inner periphery 204, an outer periphery 206, and a substantially curved cross section, and is mounted in the radial flow portion 114 of the annular flow passage 108. In particular, the particle arrestor ring 138 extends substantially along the entire length of the radial flow portion 114, and is mounted such that its inner periphery 204 is positioned proximate the turbine blades 130. With this cross sectional shape and mounting position, the particle arrestor ring 138 blocks any line of sight paths that extend from the turbine wheel 122, through the radial flow portion 114, to the radial outlet port 110.

During normal turbine operation, compressed air is directed, from a source, into the inlet plenum 104. The air flows through the inlet port 106 and into the annular flow passage 108. From there, the air passes through the axial flow portion 112 and impinges upon the turbine blades 130 that extend into the axial flow portion 112, causing the turbine wheel 122 to rotate. The air then flows into the radial flow portion 114, past the particle arrestor ring 138, and out the radial fluid outlet port 110.

In the event of a turbine failure, metallic fragments and particles will become loosened from the turbine wheel 122, as well as from other portions of the ATS 100. Many of the heavier fragments and particles will be contained within the housing assembly 102 by the containment ring 132. However, many of the relatively lighter particles will be swept, at relatively high energy, toward the radial fluid outlet port along with the exhaust fluid. Because these particles have a higher density than the exhaust fluid, the trajectory of the particles is not highly influenced by the fluid flow. Thus, the particles tend to travel in substantially straight-line trajectories. As noted above, the cross sectional shape and mounting position of the particle arrestor ring 138 blocks any straight, line of sight paths between the turbine wheel 122 and the radial outlet 110. As a result, the particles that reach the radial outlet 110 will collide with the particle arrestor ring 138, give up significant amounts kinetic energy, and become relatively harmless debris.

The particle arrestor ring 138 is not only useful for installation into newly constructed ATSs 100, but may also be installed into existing ATSs 100 that do not have one or more of the particle arrestor rings 138. To do so, a portion of the housing assembly 102 is disassembled to expose at least the portion of the exhaust housing 118 that forms the radial flow portion 114 of the annular flow passage 108. Then, if exhaust-housing 118 does not have pre-existing threaded maintenance openings 406, a plurality of threaded openings 406 are tapped into the exhaust housing 118. The threaded openings 406 are positioned and spaced to be collocated with the openings 210 formed in the particle arrestor ring flange members 208. One or more (preferably one) of the particle arrestor rings 138 are then mounted into the radial flow passage 114 using the threaded fasteners 404 and spacers 402.

Figure 5:
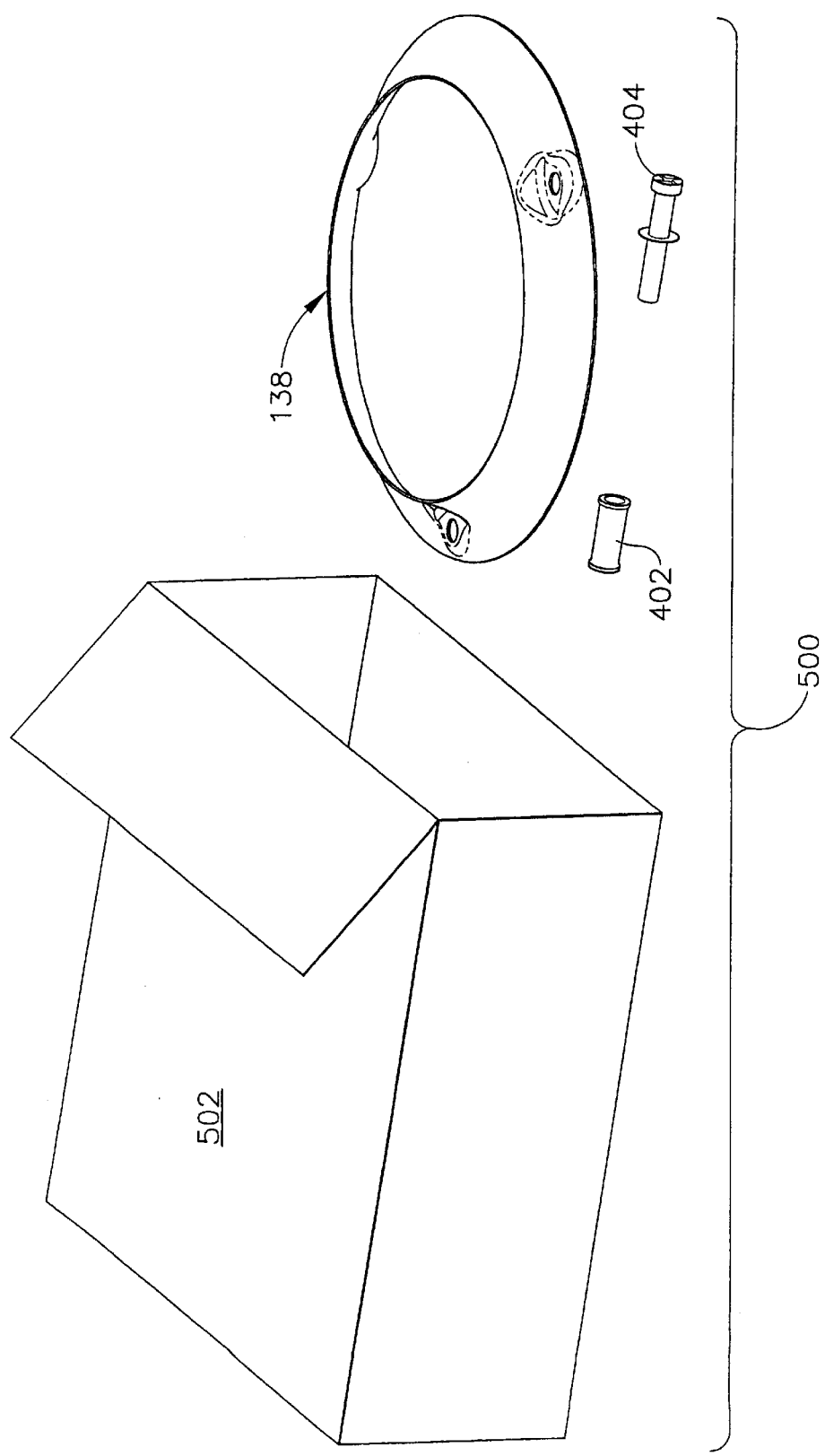
FIG. 5 depicts an exemplary embodiment of a kit that may be used to modify an air turbine starter.

In order to make the modifications described immediately above, the facility making the modification may use a kit 500, such as the one depicted in FIG. 5. Preferably, the kit 500 includes at least one or more particle arrestor rings 138, and three or more spacers 402 and three or more threaded fasteners 404 per particle arrestor ring. The kit 500 may also include other appropriate components and/or tools necessary to install the particle arrestor ring 138 in an ATS 100. The kit 500 may also include an appropriate container 502 for shipping, storage, or other purposes.

The particle arrestor ring 138 substantially inhibits particles from exiting the radial outlet port 110 with sufficiently high energy to cause collateral damage to surrounding equipment and components. The shape of particle arrestor ring 138 not only blocks line of sight paths between the turbine wheel 122 and the radial outlet port 110, but also makes the deflector ring 138 relatively stiff and, therefore, resistant to vibration induced fatigue damage. Additionally, because the particle arrestor ring 138 is positioned entirely within the turbine housing 102, the arrestor ring 138 is protected from damage during handling, and the size envelope of the ATS 100 is not impacted.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A particle arrestor for an air turbine starter having a fluid flow passage with a curved radial flow portion proximate to a turbine with blades mounted inside the air turbine starter, the particle arrestor comprising:

a main body having an inner peripheral edge and an outer peripheral edge and a wall therebetween sized for mounting within the curved radial flow portion of the air turbine starter.

2. The particle arrestor of claim 1, wherein the main body of the particle arrestor is dimensioned so as to extend substantially along an entire length of the curved radial flow portion, extending away from a position proximate to the turbine blades, when installed in the air turbine starter.

3. The particle arrestor of claim 1, wherein the main body of the particle arrestor has at least two flange members formed therein, each flange member having a substantially flat portion.

4. The particle arrestor of claim 3, wherein each flange member has an opening extending therethrough for receiving fasteners.

5. The particle arrestor of claim 1, wherein the main body is ring shaped and the inner peripheral edge and the outer peripheral edge each define an opening.

6. The particle arrestor of claim 1, wherein the main body of the particle arrestor has a generally tapered shape.

7. A particle arrestor for an air turbine starter having a fluid flow passage with a curved radial flow portion proximate to a turbine with blades mounted for rotation inside the air turbine starter, the particle arrestor comprising:

a ring-shaped main body having an inner peripheral edge and an outer peripheral edge and a wall therebetween sized for mounting within the curved radial flow portion of the air turbine starter;

and wherein the inner peripheral edge of the main body and the outer peripheral edge of the main body each define a generally circular opening.

8. The particle arrestor of claim 7, wherein the main body of the particle arrestor is dimensioned so as to extend substantially along an entire length of the curved radial flow portion, extending away from a position proximate to the turbine blades, when installed in the air turbine starter.

9. The particle arrestor of claim 7, wherein the main body of the particle arrestor has at least two flange members formed therein, each flange member having a substantially flat portion.

10. The particle arrestor of claim 9, wherein each flange member has an opening extending therethrough for receiving fasteners.

11. The turbine of claim 7, wherein each of the particle arrestor rings blocks a line of sight path between the turbine wheel and the flow passage outlet port.

12. A particle arrestor for an air turbine starter having an annular fluid flow passage extending from a fluid inlet port through a substantially axial flow portion and then through a substantially curved radial flow portion to a fluid outlet port, and having a turbine wheel rotationally mounted within the air turbine starter and having at least two turbine blades extending radially into the axial flow portion, the particle arrestor comprising:

a ring-shaped main body portion having an inner peripheral edge and an outer peripheral edge for mounting within the curved radial flow portion of the air turbine starter proximate to the turbine wheel, the main body having a generally tapered shape and having a substantially curved cross section extending between the inner peripheral edge and the outer peripheral edge of the main body.

13. The particle arrestor ring of claim 12, wherein the main body of the particle arrestor is dimensioned so as to extend substantially along the entire length of the curved radial flow portion of the air turbine starter, from proximate to the turbine blades to proximate the fluid outlet port, when installed in the turbine housing.

14. The particle arrestor of claim 12, wherein the main body of the particle arrestor wall has at least two flange members formed therein, each flange member having a substantially flat portion.

15. The particle arrestor of claim 14, wherein each flange portion has an opening extending therethrough for receiving fasteners.

16. The turbine of claim 12, wherein each particle arrestor ring main body portion has at least two flange members formed therein, each flange member having a substantially flat portion.

* * * * *